US007408447B2

(12) United States Patent
Watson

(10) Patent No.: US 7,408,447 B2
(45) Date of Patent: Aug. 5, 2008

(54) WIRELESS, PASSIVE WHEEL-SPEED AND CADENCE DETECTION SYSTEM

(75) Inventor: Edward M. Watson, Madison, WI (US)

(73) Assignee: Saris Cycling Group, Inc., Madison, WI (US)

( * ) Notice: Subject to any disclaimer, the term of this patent is extended or adjusted under 35 U.S.C. 154(b) by 101 days.

(21) Appl. No.: 11/208,379

(22) Filed: Aug. 19, 2005

(65) Prior Publication Data

US 2006/0049822 A1 Mar. 9, 2006

Related U.S. Application Data

(60) Provisional application No. 60/602,837, filed on Aug. 19, 2004.

(51) Int. Cl.
*B62J 3/00* (2006.01)
*G01P 15/00* (2006.01)

(52) U.S. Cl. ........................................ 340/432; 73/489

(58) Field of Classification Search ................ 340/432, 340/870.2, 870.3, 8, 870.19, 870.24, 825.61; 364/565; 73/489; 43/489–492; 368/10; 324/166, 172–174
See application file for complete search history.

(56) References Cited

U.S. PATENT DOCUMENTS 4,074,196 A 2/1978 Webster
4,633,216 A * 12/1986 Tsuyama .................... 340/432
5,008,647 A 4/1991 Brunt et al.
5,170,161 A * 12/1992 Sakurai .................. 340/870.3
6,431,573 B1 * 8/2002 Lerman et al. .............. 280/261

FOREIGN PATENT DOCUMENTS

| | | |
|---|---|---|
| DE | 4007653 | 9/1991 |
| EP | 0402620 | 12/1990 |
| EP | 0836165 | 4/1998 |

* cited by examiner

*Primary Examiner*—Davetta W. Goins
*Assistant Examiner*—Sigmund Tang

(57) ABSTRACT

A wireless, passive wheel-speed and detection system is provided for measuring the rate of rotation of a rotating component of a bicycle. The detection system includes a sensor arrangement having a first portion mounted on the bicycle and a second portion mounted on the rotating component. The sensor arrangement generates an input signal representative of a revolution of the rotating component. A transmitter circuit is operatively connected to the sensor arrangement for converting the input signal to a radio frequency signal and for transmitting the radio frequency signal. A controller receives the radio frequency signal and translates the radio frequency signal to a value indicative of a rate of rotation of the rotating component.

16 Claims, 3 Drawing Sheets

WIRELESS, PASSIVE WHEEL-SPEED AND CADENCE DETECTION SYSTEM

CROSS-REFERENCE TO RELATED APPLICATION

This application claims priority from U.S. Provisional Application Ser. No. 60/602,837, filed on Aug. 19, 2004.

FIELD OF THE INVENTION

This invention relates generally to bicycles, and in particular, to a wireless, passive wheel-speed and/or cadence detection system for providing predetermined information to a rider of the bicycle.

BACKGROUND AND SUMMARY OF THE INVENTION

Bike computers are often used by cyclists to monitor the time, distance and speed of a bicycle. Typically, these devices include a sensor mounted adjacent a wheel or a pedal assembly of the bicycle. A computer or display unit is mounted on the handlebars of a bicycle to provide a visual display for the rider. The computer and the sensor are hard wired together to allow for the transmission of data from the sensor to the computer. It can be appreciated that the wiring of a device on a bicycle is a time consuming task. Further, the results may not provide sufficient durability for those bicycles operated in rough terrains and may not be aesthetically pleasing.

By way of example, Tsuyama, U.S. Pat. No. 4,633,216 discloses a running data display unit for a bicycle that calculates running data such as running speed, running distance, average speed and maximum speed of a bicycle, based on pulse signals from revolution detecting devices, such as the ones provided for in Webster, U.S. Pat. No. 4,074,196. Each revolution detecting devices includes a sensor and a magnet base. The sensor is fixed at the top of a fork supporting the front wheel of the bicycle and the magnet base is fixed to a spoke of a wheel. For each revolution of the front wheel, the magnet base passes the sensor, and as a result, a lead switch in the sensor is activated so as to provide a pulse signal to a computer in the main body. A similar revolution detection device may be mounted to the crank to provide similar information to the computer. The computer and the revolution detection devices are electrically connected by means of connecting wires. Given the time required to mount the data display unit to the bicycle and to run the connecting wires between the components, it would be highly desirable to provide a detection system that overcomes the structural limitations of the prior art.

Therefore, it is a primary object and feature of the present invention to provide a wireless, passive wheel-speed and cadence detection system.

It was a further object and feature of the present invention to provide a wireless, passive wheel-speed and cadence detection system that is simple to install and inexpensive to manufacture.

It is a still further object and feature of the present invention to provide a wireless, passive wheel-speed and cadence detection system that overcomes the limitations of prior art systems.

In accordance with the present invention, a detection system is provided for measuring a cadence of an operator pedaling a bicycle. The bicycle has a frame supporting a pedal assembly. The detection system includes a cadence circuit operatively connected to the bicycle for measuring the cadence of the operator pedaling the bicycle and for generating a cadence signal corresponding to the measured cadence. A transmission circuit generates a radio frequency signal corresponding to the cadence signal and transmits the radio frequency signal to a target.

The cadence circuit includes a sensing circuit mounted one of the frame and the pedal assembly. The cadence circuit also includes an inducement element mounted to the other of the frame and the pedal assembly. The inducement element causes the sensing circuit to generate an electrical signal in response to a revolution of the pedal assembly. It is contemplated for the inducement element to be a magnet.

In a first embodiment, the sensing circuit includes a pickup coil generating an induced signal in response to the inducement element passing in proximity thereto. In addition, the sensing circuit includes a transformer operatively connected to the pickup coil for transforming the induced signal and providing the transformed induced signal to the transmission circuit as the cadence signal. The transformer has a primary coil electrically connected to the pickup coil and a secondary coil operatively connected to the transmission circuit. The transmission circuit includes an inductor and a capacitor circuit connected in parallel with the inductor. The target includes a controller connectable to the bicycle. The controller receives the radio frequency signal transmitted by the transmission circuit and converts the radio frequency signal to a cadence value for visual display.

In an alternate embodiment, the sensing circuit includes a power source for generating electrical power and a reed switch operatively connecting the power source to the transmission circuit. The reed switch is movable in response to the inducement element passing in proximity thereto between an open configuration and a closed configuration wherein the electrical power generated by the power source is provided to the transmission circuit as the cadence signal.

The bicycle also includes a fork assembly mounted to the frame and a wheel rotatably supported on the fork assembly. It is contemplated for the detection circuit to also include a second cadence circuit operatively connect to the fork assembly for generating a second cadence signal representative of a wheel speed of a wheel and a second transmission circuit for generating a second radio frequency signal corresponding to the second cadence signal and transmitting the second radio frequency signal to the target.

In accordance with a further aspect of the present invention, detection system is provided for measuring the rate of rotation of a rotating component of a bicycle. The detection system includes a sensor arrangement having a first portion mounted on the bicycle and a second portion mounted on the rotating component. The sensor arrangement generates a cadence signal representative of a revolution of the rotating component. A transmitter circuit is operatively connected to the sensor arrangement for converting the cadence signal to a radio frequency signal and for wirelessly transmitting the radio frequency signal. A controller receives the radio frequency signal and translates the radio frequency signal to a value indicative of a rate of rotation of the rotating component.

The controller includes a receiver configured to receive the radio frequency signal transmitted by the transmitter circuit. The first portion of the sensor arrangement includes a sensing circuit mounted to the bicycle and the second portion of the sensor arrangement includes an inducement element mounted to the rotating component. The inducement element causes the sensor circuit to generate an electrical signal in response to a revolution of the rotating component.

In a first embodiment, the sensing circuit includes a pickup coil that generates the electrical signal in response to the inducement element passing in proximity thereto. The sensing circuit also includes a transformer operatively connected to the pickup coil for transforming the electrical signal and providing the transformed electrical signal to the transmitter circuit as the cadence signal. In an alternate embodiment, the sensing circuit includes a power source for generating electrical power and a reed switch operatively connecting the power source to the transmission circuit. The reed switch is movable in response to the inducement element passing in proximity thereto between an open configuration and a closed configuration wherein the electrical power generated by the power source is provided to the transmission circuit as the cadence signal.

The bicycle also includes a fork assembly mounted to the frame and a wheel rotatably supported on the fork assembly. It is contemplated for the detection circuit to also include a second cadence circuit operatively connect to the fork assembly for generating a second cadence signal representative of a wheel speed of a wheel and a second transmission circuit for generating a second radio frequency signal corresponding to the second cadence signal and transmitting the second radio frequency signal wirelessly to the target.

In accordance with a still further aspect of the present invention, a method is provided for measuring a rate of rotation of a rotatable component of a bicycle. The bicycle includes a frame to which the component is rotatably mounted. The method includes the steps of detecting a revolution of the rotatable component and generating an electrical signal in response thereto that is representative of the detected revolution of the rotatable component. The electrical signal is converted to a radio frequency signal and a rate of rotation of the component is determined in response to the radio frequency signal.

It is contemplated to wirelessly transmit the radio frequency signal prior to the step of determining the rate of rotation and to transform the electrical signal prior to step of converting the electrical signal. The rotatable component may be a pedal assembly of the bicycle or may be a wheel rotatably supported by the frame of the bicycle.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
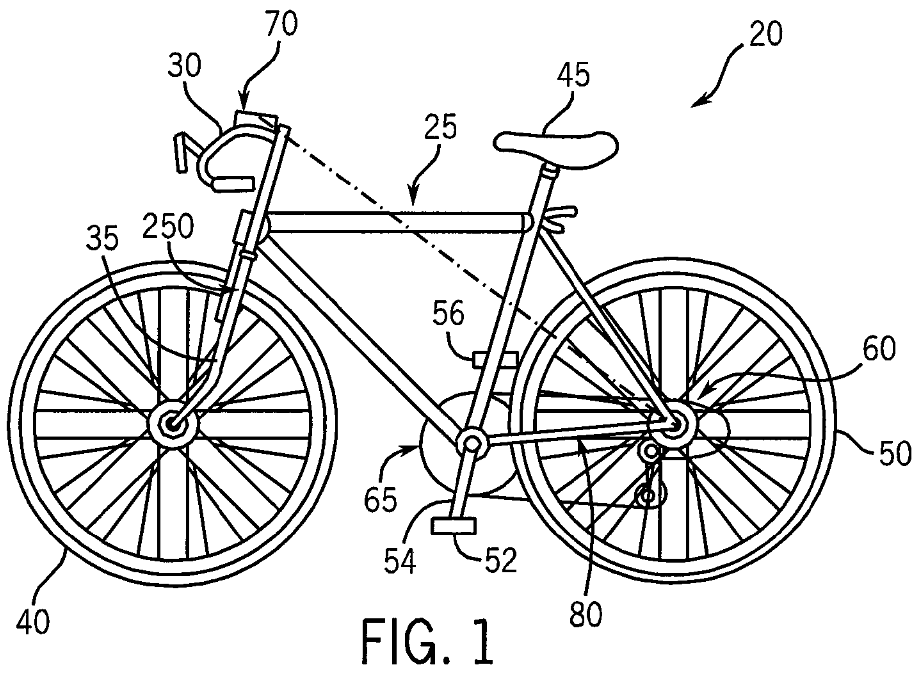
FIG. 1 is a schematic view of a bicycle incorporating the detection system of the present invention.

FIG. 1 illustrates a bicycle 20 having a frame assembly 25. A handlebar 30 is mounted to an upper end of a front fork 35, which is mounted to the front of the frame assembly 25 in a manner as is known. A front wheel 40 is mounted for rotation on the front fork 35, also in a manner as is known. A seat 45 and a driven rear wheel 50 are mounted to the frame assembly 25 rearwardly of the handlebar 30 and the front wheel 40. The frame assembly 25 further supports a crank assembly configured to impart rotation to the rear wheel. The crank assembly generally includes a left hand pedal 52 mounted on a left-hand crank arm 54, and a right-hand pedal 56 mounted on a right-hand crank arm (not shown) in a manner as is known. Rotation of the left-hand and right-hand pedals 52 and 56 imparts rotation to a hub 60 of the rear wheel 50 via a chain and sprocket drive system 65 in a conventional manner.

Still referring to FIG. 1, a memory and a processing device, which may be in the form of a bicycle computer 70, is secured to the bicycle in a suitable location, such as to the handlebar 30. The computer 70 includes a display for conveying relevant information to the user during operation of the bicycle 20, and a memory for storing information pertaining to one or more operating characteristics of the bicycle 20.

FIG. 1 further illustrates a passive, wireless cadence detection system 80 that is mounted to the frame assembly 25. The passive, wireless cadence detection system 80 is configured to measure and display a value of a number of pedal strokes or revolutions per minute (rpms) by the bicyclist. Although FIG. 1 shows the detection system 80 mounted on the left-hand side of the bicycle 20, it is understood that the detection system 80 can be mounted on the right-hand side of the bicycle 20 or in any other satisfactory location.

Figure 2:
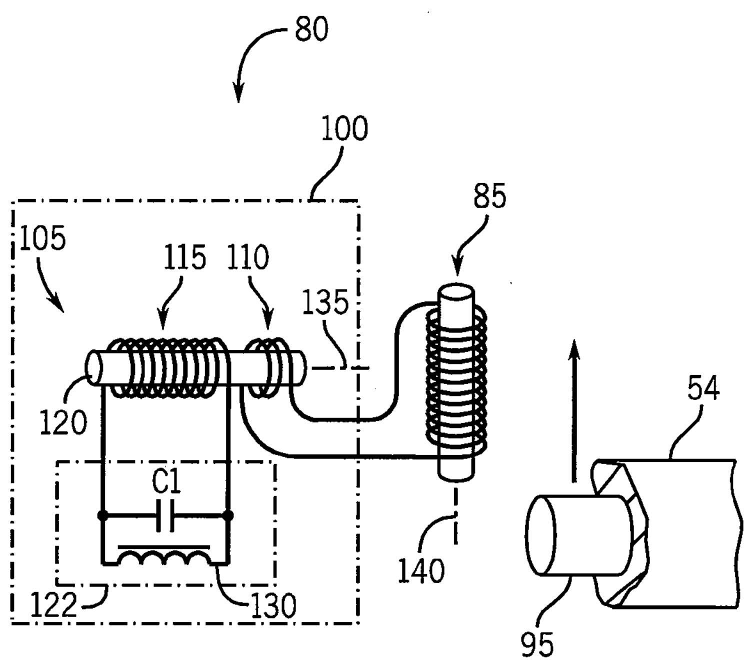
FIG. 2 is a schematic view of a sensing and transmission circuit for the detection system of the present invention.

FIG. 2 illustrates a preferred embodiment of cadence detection system 80 in accordance with the present invention. The detection system 80 generally includes a sensor comprising a first pickup coil 85 mounted on the frame 25 of the bicycle 20. In the vicinity of the first coil 85, the detection system 80 further includes a magnet 95 mounted on the left-hand crank arm 54 of the crank assembly. With every stroke or revolution of the left pedal 52, the magnet 95 on the rotating left-hand crank arm passes the pickup coil 85. As it passes, the magnet 95 excites an electrical signal in the pickup coil 85. The passing magnet 95 is operable to excite the electrical signal in the pickup coil 85 due to a relative motion of a magnetic field of the magnet 95 with respect to the pickup coil 85 in a known manner and based on fundamental principles of Faraday's law. The position of the magnet 95 on the left crank arm 54 can vary in relative relation to the position of the pick up coil 85 on the frame 25 of the bicycle 20, but preferably the magnet 95 passes within about 0.5 inches of the pickup coil 85.

Still referring to FIG. 2, the pickup coil 85 transmits the induced electrical signal to a transmitter circuit 100. The preferred transmitter circuit 100 is passive, and therefore does not require the use of batteries. The transmitter circuit 100 includes a transformer operable to transform the electrical signal generated in the pickup coil 85. The transformer 105 includes a primary coil 110 electrically connected to the pickup coil 85, a secondary coil 115 positioned adjacent to the primary coil 10, and a core 120 extending through the primary and secondary coils 110 and 115. The induced voltage in the pickup coil 85 is transmitted via an electrical connection to the primary coil 110. The electrical signal in the primary coil 110 induces a magnetic field pulse through the core 120. The magnetic field pulse in the core 120 induces a secondary electrical signal of desired amplitude in the secondary coil

115 in a manner as is known. The number of turns (N) of wire in the primary coil 110 relative to the secondary coil 115 dictates the amplification of the secondary electrical signal.

The transmitter circuit 100 further includes a resonant circuit 122, also referred to as a "tank" circuit. The resonant circuit 122 receives the transformed electrical signal from the secondary coil 115 of the transformer 105. A preferred resonant circuit 122 includes a capacitor C1 electrically connected in parallel with an inductor. In a known manner, the resonant circuit 122 converts the induced electrical signal in the first coil 85 to a radio frequency (RF) signal at a predetermined resonant frequency associated with the size of the capacitor and the inductor used. A preferred inductor is an antenna 130 comprising a ferrite rod or core that in a known manner is operable to transmit a predetermined frequency of RF signal to the computer 70. The type of inductor and/or transmitter antenna 130 can vary. Another embodiment of the resonant circuit 122 can employ a crystalline oscillator (not shown) operable to dictate the resonant frequency of the transmitted RF signal.

Alternatively, it can be appreciated that inductor L1 may be eliminated from the detection system 80 such that secondary coil 115 with core 120 will function as the sole inductor in the tank circuit. As a result, secondary coil 115 with core 120 will resonant from the pulse input. The alternating current through the tank circuit will produce an alternating electromagnetic field radiating from the secondary coil 115 with core 120 known as radio frequency (RF).

As illustrated in FIG. 2, to avoid magnetic interference caused by the direction of the passing magnet 95 and/or the alignment of the pickup coil 85, a longitudinal axis 135 of the transformer 105 and a longitudinal axis of the transmitter antenna 130 of the transmitter circuit 100 are orthogonally aligned relative to a direction of the passing magnet 95 and a longitudinal axis 140 of the pickup coil 85. This orthogonal alignment reduces interference or noise associated with the moving magnetic field of the magnet 95 and the induced electrical signal in the pickup coil 85.

The factors determining the power of the RF signal transmitted by the transmitter antenna 130 include the relative pedaling speed, the receiver sensitivity at the bicycle computer 70, the receiver range of the computer 70 relative to the detection system 80, and the coil size of the transmission antenna 130. Testing has shown that less than one-milliwatt of power can be sufficient to transfer the electrical signal from the transmitter circuit 100 of the detection system 80 to the bicycle computer 70.

Figure 3:
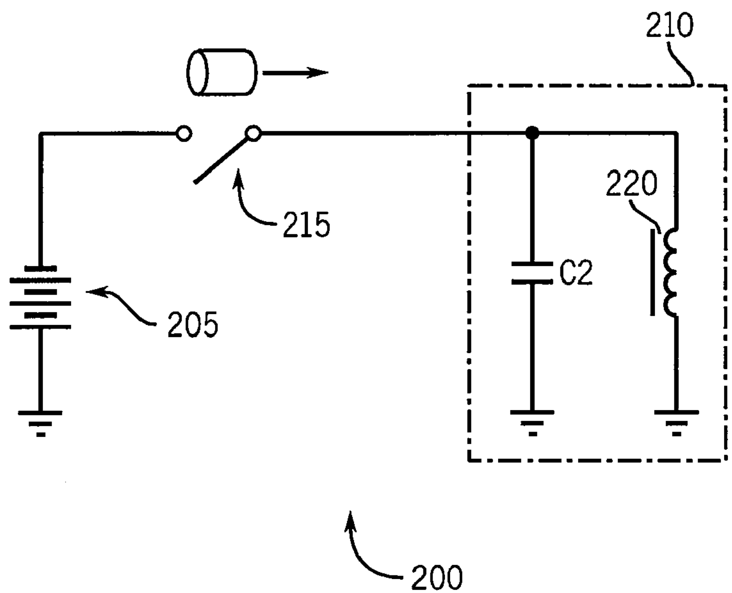
FIG. 3 is a schematic view of an alternate embodiment of a sensing and transmission circuit for the detection system of the present invention.

Referring to FIG. 3, an alternative embodiment of a wireless cadence detection system 200 is operable to provide a more uniform RF signal to the computer 70. The cadence detection system 200 includes a small energy cell or battery cell 205 operable to provide electrical power to a transmitter circuit 210. Instead of the pickup coil 85 described above, a reed switch 215 is positioned in the vicinity of the travel path of the magnet 95 on the pedal crank arm 54. The reed switch 215 is electrically connected to the battery cell 205. In an active state, the reed switch 215 is open and interrupts an electrical path from the battery cell 205 to the transmitter circuit 210. The passing magnetic field of the magnet 95 on the moving left crank arm 54 causes the reed switch 215 to close. The closed reed switch 215 completes the electrical path such that the battery cell 205 provides electrical power to the transmitter circuit 210. The transmitter circuit 210 includes a resonant circuit having a capacitor C2 connected in parallel with an inductor/antenna 220 similar to the resonant circuit 122 described above. The transmitter circuit 210 transmits the RF signal to the computer 70. Upon the magnet 95 leaving the vicinity of the reed switch 215, the reed switch 215 returns to the open state and once again interrupts the electrical path from the battery cell 205 to the transmitter circuit 100. A preferred battery cell 205 is operable to supply a continuous electrical pulse of one milliamp per five hundred microseconds at a duty cycle of 0.001 with a battery life of approximately three years.

Figure 4:
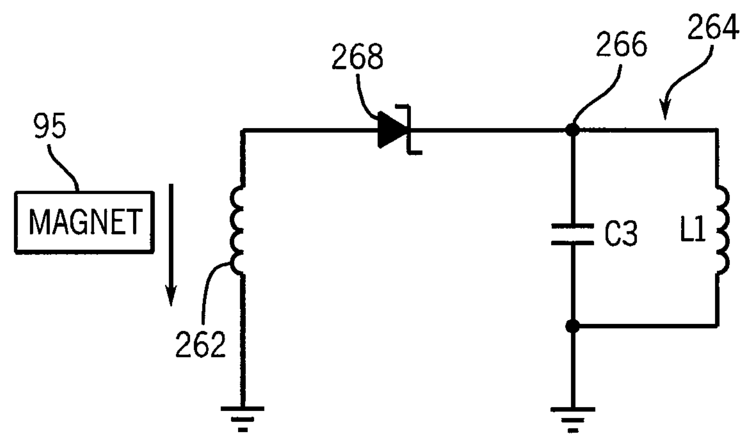
FIG. 4 is a schematic view of a further alternate embodiment of a sensing and transmission circuit for the detection system of the present invention.

Referring to FIG. 4, a further embodiment of a cadence detection system accordance with the present invention is generally designated by the reference numeral 260. Detection system 260 generally includes a sensor comprising pickup coil 262 mounted on the frame 25 of the bicycle 20. In the vicinity of pickup coil 262, detection system 260 further includes magnet 95 mounted on the left-hand crank arm 54 of the crank assembly. With every stroke or revolution of left pedal 52, magnet 95 on the rotating left-hand crank arm passes pickup coil 262. As it passes, magnet 95 excites an electrical signal in pickup coil 262. As heretofore described, the passing magnet 95 is operable to excite the electrical signal in pickup coil 262 due to a relative motion of the magnetic field of magnet 95 with respect to pickup coil 262 in a known manner and based on fundamental principles of Faraday's law. The position of magnet 95 on the left crank arm 54 can vary in relative relation to the position of pick up coil 262 on frame 25 of bicycle 20, but preferably magnet 95 passes within about 0.5 inches of pickup coil 262.

Still referring to FIG. 4, pickup coil 262 transmits the induced electrical signal to resonant circuit 264 at node 266. Resonant circuit 264 is passive, and therefore, does not require the use of batteries. Schottky diode 268 acts to isolate resonant circuit 264 from pickup coil 262. Resonant circuit 264 is also referred to as a "tank" circuit. The resonant circuit 264 receives the induced electrical signal at node 266. Capacitor C3 is connected in parallel with inductor L1. In a known manner, resonant circuit 264 converts the induced electrical signal to a radio frequency (RF) signal at a predetermined resonant frequency associated with the size of C3 capacitor and inductor L1 used. Inductor L1 may take the form of an antenna comprising a ferrite rod or core that in a known manner is operable to transmit a predetermined frequency of RF signal to the computer 70. The type of inductor and/or transmitter antenna can vary.

Figure 5:
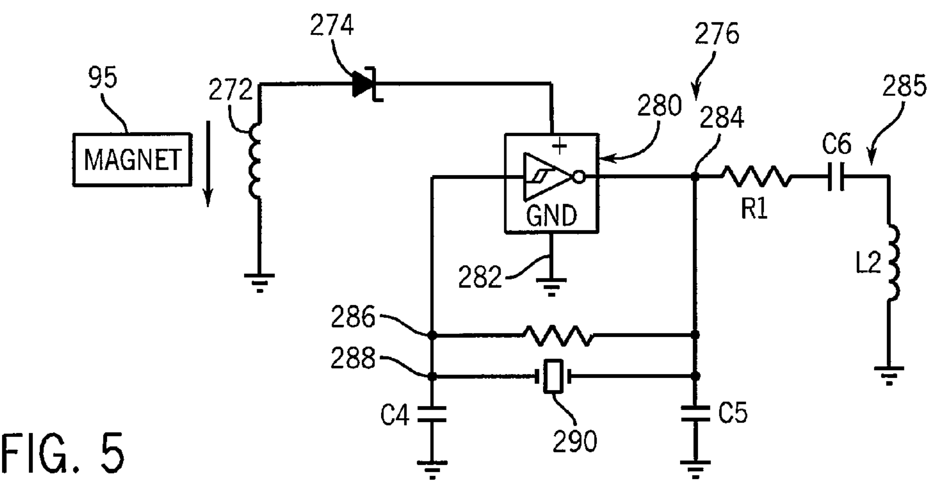
FIG. 5 is a schematic view of a still further alternate embodiment of a sensing and transmission circuit for the detection system of the present invention.

Referring to FIG. 5, a still further embodiment of a cadence detection system accordance with the present invention is generally designated by the reference numeral 270. Similar to the cadence detection systems of FIGS. 2-4, cadence detection system 270 includes a sensor comprising pickup coil 272 mounted on the frame 25 of the bicycle 20. In the vicinity of pickup coil 272, detection system 260 further includes magnet 95 mounted on the left-hand crank arm 54 of the crank assembly. With every stroke or revolution of left pedal 52, magnet 95 on the rotating left-hand crank arm passes pickup coil 272. As it passes, magnet 95 excites an electrical signal in pickup coil 272. As heretofore described, the passing magnet 95 is operable to excite the electrical signal in pickup coil 272 due to a relative motion of the magnetic field of magnet 95 with respect to pickup coil 272 in a known manner and based on fundamental principles of Faraday's law. The position of magnet 95 on the left crank arm 54 can vary in relative relation to the position of pick up coil 272 on frame 25 of bicycle 20, but preferably magnet 95 passes within about 0.5 inches of pickup coil 272.

Pickup coil 272 transmits the induced electrical signal to oscillator circuit 276 through Schottky diode 274. Oscillator circuit 276 is passive, and therefore, does not require the use of batteries. Schottky diode 274 acts to isolate oscillator circuit 276 from pickup coil 272. Oscillator circuit 276 includes Schmidt trigger 280 that receives the induced electrical signal and is operable to dictate the resonant frequency of the transmitted RF signal, as hereinafter described. Schmidt trigger 280 receives the induced electrical signal as the reference voltage and an input thereto. Schmidt trigger 280 is grounded through line 282 and includes an output connected to node 284. Node 284 is connected to ground through capacitor C5 and through resonant circuit 285 defined by resistor R1, capacitor C6 and inductor L2 connected in series. In addition, node 284 is electrically coupled to the input of Schmidt trigger 280 at nodes 286 and 288 through resistor R2 and through crystal oscillator 290, respectively, connected in parallel to each other. The input of Schmidt trigger 280 is grounded through capacitor C4.

In operation, Schmidt trigger 280 is turned "on" by the induced electrical signal received from pickup coil 272 and generates a pulsed signal at its output. In a known manner, resonant circuit 295 converts the pulsed signal to a radio frequency (RF) signal at a predetermined resonant frequency associated with the size of C6 capacitor and inductor L2. The frequency of the pulsed signal is stabilized by crystal oscillator 290 which amplifies and feeds the pulsed signal back into Schmidt trigger 280.

Figure 6:
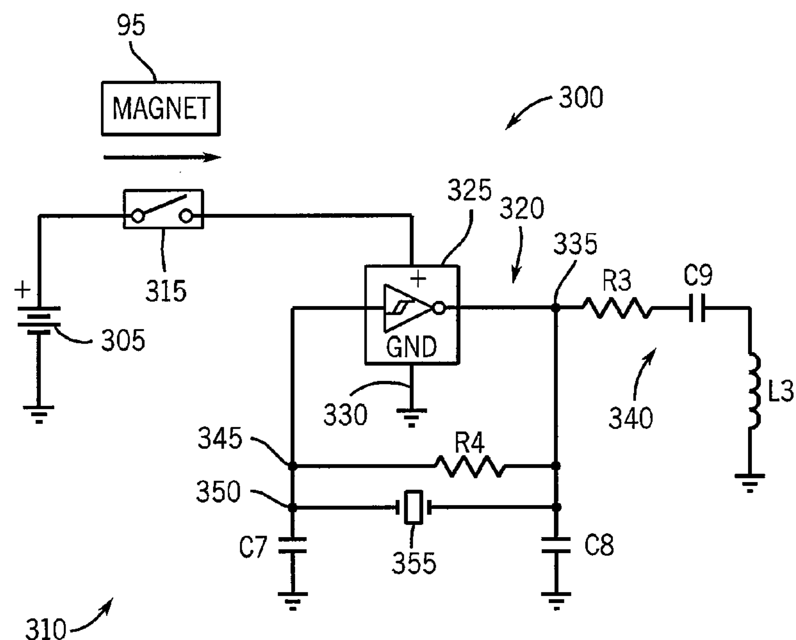
FIG. 6 is a schematic view of a still further alternate embodiment of a sensing and transmission circuit for the detection system of the present invention.

Referring to FIG. 6, an alternate embodiment of a wireless cadence detection system in accordance with the present invention is generally designated by the reference numeral 300. Cadence detection system 300 includes a small energy cell or battery cell 305 operable to provide electrical power to oscillator circuit 320. Reed switch 315 is positioned in the vicinity of the travel path of magnet 95 on pedal crank arm 54. Reed switch 215 is electrically connected to battery cell 305. In an active state, reed switch 315 is open and interrupts an electrical path from battery cell 305 to oscillator circuit 320. The passing magnetic field of magnet 95 on the moving left crank arm 54 causes the reed switch 315 to close. The closed reed switch 315 completes the electrical path such that battery cell 305 provides electrical power to oscillator circuit 320.

Oscillator circuit 320 is passive, and therefore, does not require the use of batteries. Oscillator circuit 320 includes Schmidt trigger 325 that receives the electrical power from battery cell 305 and is operable to dictate the resonant frequency of the transmitted RF signal, as hereinafter described. Schmidt trigger 325 receives the electrical power as the reference voltage and an input thereto. Schmidt trigger 325 is grounded through line 330 and includes an output connected to node 335. Node 335 is connected to ground through capacitor C8 and through resonant circuit 340 defined by resistor R3, capacitor C9 and inductor L3 connected in series. In addition, node 340 is electrically coupled to the input of Schmidt trigger 325 at nodes 345 and 350 through resistor R4 and through crystal oscillator 355, respectively, connected in parallel to each other. The input of Schmidt trigger 325 is grounded through capacitor C4.

In operation, Schmidt trigger 325 is turned "on" by electrical power supplied by battery cell 305 with reed switch 315 in the closed position thereby generating a pulsed signal at its output. In a known manner, resonant circuit 340 converts the pulsed signal to a radio frequency (RF) signal at a predetermined resonant frequency associated with the size of C9 capacitor and inductor L3. The frequency of the pulsed signal is stabilized by crystal oscillator 290 which amplifies and feeds the pulsed signal back into Schmidt trigger 325.

Referring to FIG. 1, the bicycle 20 can further include a wheel speed detection system 250 mounted on the front fork 35 adjacent to the front wheel 40. A preferred wheel speed detection system 250 can include a magnet interactive with a pickup coil similar to the cadence detection systems depicted in FIGS. 2-5 and described above. As such, the prior description of the cadence detection systems depicted in FIGS. 2-5 is understood to described speed detection system 250 as if fully described herein. The speed detection magnet can be positioned on the front wheel 40, and the pickup coil can be mounted on the fork 35. In a similar manner to the cadence systems described above, the magnet excites an electrical signal in the pickup coil mounted on the front fork 35. The transmitter circuit converts the induced electrical signal from the pickup coil to an RF signal and transmits the RF signal the computer 70. The bicycle computer 70 is operable to receive and convert the RF signal to a value of speed for display on the computer 70. Alternatively, the speed detection system 150 can be hard-wired to the computer 70.

Furthermore, any one of the wireless cadence detection systems depicted In FIGS. 2-5 and the wheel speed detection system 250 can be simultaneously employed on the bicycle 20. Each of the wireless cadence detection systems depicted in FIGS. 2-5 would provide a first RF signal at a first frequency to the computer 70. The speed detection system 250 provides a second RF signal at a second frequency to the computer 70. The computer 70 is configured to distinguish between the first and second RF signals in determining a cadence value and a wheel speed value. Otherwise, the computer 70 can be configured to receive a wireless transmission from one of the cadence detection systems depicted in FIGS. 2-5, and a hard-wire transmission from the speed detection system 250, or vise versa. In addition, while the invention has been shown and described as communicating the RF signal to the computer 70, it is also contemplated that the signal may be received at any other location on bicycle 20. For example, the cadence or speed signal may be received by a receiver located in another component, e.g. within a power sensing hub, and packaged together with power sensing signals that are transmitted to the computer or other storage or display device.

The invention thereby provides a low cost means to provide a cadence sensor and/or a wheel speed sensor on a bicycle 20. The sensor system of the invention is easy to install on the bicycle, and eliminates the clutter and inconvenience of wires. The system of the invention can be enclosed in a hermetically sealed housing, since there are not battery doors, wires, etc., which prolongs the life of the system. In the event a battery is used to power the system, the low power requirements of the powered version of the system enables the battery compartment to be sealed. In the powered version of the system, the battery unit runs the system throughout the entire life expectancy of the system.

Furthermore, although the combination of the cadence detection system 80 and the wheel speed detection system 250 is illustrated on a bicycle 20, the cadence detection system and/or speed detection system 250 of the present invention can be employed on other types of exercise apparatuses (e.g., stationary bicycles, etc.) and is not limiting on the invention.

The above discussion, examples, and embodiments illustrate my current understanding of the invention. However, since many variations of the invention can be made without departing from the spirit and scope of the invention, the invention resides wholly in the claims hereafter appended.

I claim:

1. A detection system operable for measuring a cadence of an operator pedaling a bicycle, the bicycle having a frame supporting a pedal assembly, comprising:

a cadence circuit operatively connected to the bicycle for measuring the cadence of the operator pedaling the bicycle and generating a cadence signal corresponding to the measured cadence; and a transmission circuit for generating a radio frequency signal corresponding to the cadence signal and transmitting the radio frequency signal to a target, wherein the cadence circuit includes:

a sensing circuit mounted to one of the frame and the pedal assembly;

an inducement element mounted to the other of the frame and pedal assembly, the inducement element causing the sensing circuit to generate an electrical signal in response to a revolution of the pedal assembly; and wherein the sensing circuit includes:

a pickup coil generating an induced signal in response to the inducement element passing in proximity thereto; and a transformer operatively connected to the pickup coil for transforming the induced signal and providing the induced signal to the transmission circuit as the cadence signal.

2. The detection system of claim 1 wherein the transformer has a primary coil electrically connected to the pickup coil and a secondary coil operatively connected to the transmission circuit.

3. The detection system of claim 2 wherein the transmission circuit includes: an inductor; and a capacitor circuit connected in parallel with the inductor.

4. The detection system of claim 1 wherein the target includes a controller connectable to the bicycle, the controller receiving the radio frequency signal transmitted by the transmission circuit and converting the radio frequency signal to a cadence value for visual display.

5. The detection system of claim 1 wherein the sensing circuit includes:

a power source for generating electrical power; and a reed switch operatively connecting the power source to the transmission circuit, the reed switch movable in response to the inducement element passing in proximity thereto between an open configuration and a closed configuration wherein the electrical power generated by the power source is provided to the transmission circuit as the cadence signal.

6. The detection system of claim 1 wherein the bicycle includes a fork assembly mounted to the frame and a wheel rotatably supported on the fork assembly, the detection circuit further comprising: a second circuit operatively connect to the fork assembly for generating a second signal representative of a wheel speed of a wheel; and a second transmission circuit for generating a second radio frequency signal corresponding to the second signal and transmitting the second radio frequency signal to the target.

7. A detection system operable to measure the rate of rotation of a rotating component of a bicycle, the detection system comprising:

a sensor arrangement having a first portion mounted on the bicycle and a second portion mounted on the rotating component, the sensor arrangement operable to generate an input signal representative of a revolution of the rotating component;

a transmitter circuit operatively connected to the sensor arrangement for converting the input signal to a radio frequency signal and for transmitting the radio frequency signal; and a controller for receiving the radio frequency signal and for translating the radio frequency signal to a value indicative of a rate of rotation of the rotating component, wherein the first portion of the sensor arrangement includes a sensing circuit mounted to the bicycle and wherein the second portion of the sensor arrangement includes an inducement element mounted to the rotating component, the inducement element causing the sensor circuit to generate an electrical signal in response to a revolution of the rotating component, and wherein the sensing circuit includes: a pickup coil generating the electrical signal in response to the inducement element passing in proximity thereto; and a transformer operatively connected to the pickup coil for transforming the electrical signal and providing the transformed electrical signal to the transmitter circuit as the input signal.

8. The detection system of claim 7 wherein the sensing circuit includes:

a power source for generating electrical power; and a reed switch operatively connecting the power source to the transmission circuit, the reed switch movable in response to the inducement element passing in proximity thereto between an open configuration and a closed configuration wherein the electrical power generated by the power source is provided to the transmission circuit as the input signal.

9. The detection system of claim 7 wherein the bicycle includes a fork assembly mounted to the frame and a wheel rotatably supported on the fork assembly, the detection system further comprising: a second input circuit operatively connected to the fork assembly for generating a second input signal representative of a wheel speed of a wheel; and a second transmission circuit for generating a second radio frequency signal corresponding to the second input signal and transmitting the second radio frequency signal.

10. A detection system operable for measuring rotation of a rotating bicycle component, wherein the bicycle includes a frame to which the rotating bicycle component is mounted, comprising:

a rotation sensing circuit operatively connected to the bicycle for sensing rotation of the rotating bicycle component and generating a signal indicative of rotation of the bicycle component, wherein the rotation sensing circuit includes a sensing circuit interconnected with one of the frame and the rotating bicycle component, and an inducement element mounted to the other of the frame and the rotating bicycle component, the inducement element causing the sensing circuit to generate an electrical signal in response to a rotation of the rotating bicycle component, wherein the sensing circuit includes a pickup coil generating an induced signal in response to the inducement element passing in proximity thereto and a transformer operatively connected to the pickup coil for transforming the induced signal and providing the induced signal to the transmission circuit as the signal; and a battery-less transmission circuit for generating a radio frequency signal corresponding to the signal and wirelessly transmitting the radio frequency signal to a target.

11. The detection system of claim 10 wherein the inducement element is a magnet.

12. The detection circuit of claim 10 wherein the transformer has a primary coil electrically connected to the pickup coil and a secondary coil operatively connected to the transmission circuit.

13. The detection circuit of claim 12 wherein the battery-less transmission circuit includes:

an inductor; and a capacitor circuit connected in parallel with the inductor.

14. The detection circuit of claim 10 wherein the target includes a processor connectable to the bicycle, the processor receiving the radio frequency signal transmitted by the transmission circuit and converting the radio frequency signal to a value for visual display.

15. The detection system of claim 1 wherein the inducement element is a magnet.

16. The detection system of claim 7 wherein the controller includes a receiver configured to receive the radio frequency signal transmitted by the transmitter circuit.

* * * * *